(12) United States Patent
Keith

(10) Patent No.: US 6,457,208 B1
(45) Date of Patent: Oct. 1, 2002

(54) ATTACHMENT DEVICE AND METHOD FOR ASSISTING IN THE WINDING OF A ROUNDED TURN KNOB

(76) Inventor: William Keith, 657 Alder Ct., Yardley, PA (US) 19067

( * ) Notice: Subject to any disclaimer, the term of this patent is extended or adjusted under 35 U.S.C. 154(b) by 0 days.

(21) Appl. No.: 09/756,041

(22) Filed: Jan. 8, 2001

(51) Int. Cl.$^7$ .............................................. A45C 13/22
(52) U.S. Cl. .............................. 16/422; 16/441; 16/427
(58) Field of Search .......................... 16/413, 441, 422, 16/427; 81/176.1, 176.15, 176.2, 121.1, 461, 28, 177.2, 177.5–177.9; D8/21, 22, 390; 292/336.3, 347

(56) References Cited

U.S. PATENT DOCUMENTS

| | | | |
|---|---|---|---|
| 230,446 A | | 7/1880 | Strange |
| 2,784,995 A | | 3/1957 | Hawkins ..................... 292/348 |
| 2,843,413 A | | 7/1958 | Martin ........................ 292/348 |
| 3,656,793 A | * | 4/1972 | Mathews .................... 294/19.1 |
| 4,278,002 A | | 7/1981 | Siminoff ....................... 84/304 |
| 4,285,536 A | | 8/1981 | McCoy et al. ........... 292/336.3 |
| 4,397,489 A | * | 8/1983 | Lind ............................. 16/413 |
| 4,971,375 A | | 11/1990 | Grecco ........................ 292/347 |
| 5,220,697 A | * | 6/1993 | Birchfield ..................... 16/426 |
| 5,231,731 A | | 8/1993 | Jones, Jr. ................... 16/114 R |
| 5,231,733 A | * | 8/1993 | Dittman ........................ 16/412 |
| 5,272,953 A | | 12/1993 | Koch ........................... 84/458 |
| 5,288,116 A | * | 2/1994 | Donofrio ............... 16/DIG. 30 |
| 5,375,295 A | * | 12/1994 | Woodward .................... 16/412 |
| 5,404,615 A | * | 4/1995 | Wafer et al. .................. 16/422 |
| 5,507,204 A | * | 4/1996 | Diffrient ...................... 16/429 |
| 5,606,897 A | * | 3/1997 | Quinn ......................... 206/349 |
| 5,653,149 A | * | 8/1997 | Cavanagh .................... 16/422 |
| 5,924,342 A | * | 7/1999 | Chou .......................... 81/120 |

* cited by examiner

*Primary Examiner*—Chuck Y. Mah
(74) *Attorney, Agent, or Firm*—LaMorte & Associates, P.C.

(57) ABSTRACT

A device and method for engaging a rounded knob so that the knob can be turned in a more rapid and ergonomically efficient manner. The claimed invention includes an auxiliary handle device. The auxiliary handle device includes a hub and a handle that extends radially away from the hub. The hub is configured to pass over the exterior of the rounded knob. Once the hub envelopes the rounded knob, the handle is rotated. As the handle is rotated, an interference fit is created between the interior of the hub and the knob. The interference fit transfers the rotational energy from the handle to the rounded knob, thereby rotating the rounded knob.

16 Claims, 3 Drawing Sheets

ATTACHMENT DEVICE AND METHOD FOR ASSISTING IN THE WINDING OF A ROUNDED TURN KNOB

BACKGROUND OF THE INVENTION

1. Field of the Invention

In general, the present invention relates to auxiliary handles that are used to assist a person in rapidly turning a rounded knob in a more ergonomically efficient manner. More particularly, the present invention relates to auxiliary handles that form the crank structures when attached to a rounded knob.

2. Description of the Prior Art

Knobs are used on many different mechanisms as the interface through which a person can manually turn some adjustable element on that mechanism. There are many different types of knobs, wherein the structure of the knob usually is dictated by its use. Rounded knobs are often used on mechanisms that require only a small degree of torque. Rounded knobs are directly grasped by a person's hand, wherein the fingers on the hand engage the surface of the rounded knob through friction. As such, only a small amount of torque can be transferred to the rounded knob by a person's hand. For example, many doors have round door knobs. The locks on doors require only a small degree of torque in order to turn. Once turning, door knobs need only be rotated a short distance in order to open the door's locking mechanism. For such situations where a small degree of torque must be applied for just a short rotated distance, round knobs are appropriate.

Rounded knobs, however, are not appropriate for all applications. If an application requires a greater torque than can be applied by the average wrist, rounded knobs do not work. Rather, in such situations, lever knobs are commonly used. Lever knobs have long handles that provide leverage and increase the amount of torque capable of being applied by a person's hand. However, lever knobs are only practical in applications where the lever knob is used to create a short rotational movement.

In applications where a substantial amount of torque must be applied for numerous rotations, crank knobs are commonly used. Crank knobs provide torque and enable a person to turn a knob hub much more rapidly than would be possible with a rounded knob.

In the prior art, there exist many different devices that are used to convert a rounded knob into either a lever knob or a crank knob. For example, U.S. Pat. No. 4,285,536 to McCoy, entitled, Universal Lever Handle Attachment For A Door Knob, shows a lever attachment for a rounded door knob. This enables older or weaker people to better grasp and turn a simple door knob. A problem associated with such prior art devices is that they are attached to a single door knob with tools. Thus, they are difficult to install and they are not practical to move from door to door.

U.S. Pat. No. 5,272,953 to Koch, entitled String Winder Tool For Musical Instrument,shows a crank attachment that can be rapidly moved from one knob to another. However, the device only works with the flat tuning knobs of stringed instruments and cannot be used on more common rounded head knobs that are used on equipment other than musical instruments.

A need therefore exists for an auxiliary attachment device for a rounded knob that can rapidly engage a rounded knob, turn a rounded knob and again be detached from the rounded knob so that it can be used on a different knob. This need is provided by the present invention as described and claimed below.

SUMMARY OF THE INVENTION

The present invention is a device and method for engaging a rounded knob so that the knob can be turned in a more rapid and ergonomically efficient manner. The claimed invention includes an auxiliary handle device. The auxiliary handle device includes a hub and a handle that extends radially away from the hub. The hub is configured to pass over the exterior of the rounded knob. Once the hub envelopes the rounded knob, the handle is rotated. As the handle is rotated, an interference fit is created between the interior of the hub and the knob. The interference fit transfers the rotational energy from the handle to the rounded knob, thereby rotating the rounded knob. The handle can be formed either as a straight handle or with a crank extension, thereby enabling a person to rapidly engage and turn a rounded knob with a mechanical advantage in applied torque.

BRIEF DESCRIPTION OF THE DRAWINGS

For a better understanding of the present invention, reference is made to the following description of exemplary embodiments thereof, considered in conjunction with the accompanying drawings, in which:

FIG. 1 is a perspective view of a prior art rounded knob;

FIG. 2 is a perspective view of an embodiment of an auxiliary handle device shown in conjunction with a prior art rounded knob;

FIG. 3 is a front view of an alternate embodiment of an auxiliary handle device; and FIG. 4 is a cross-sectional view of the embodiment of the auxiliary handle device shown in FIG. 3.

DETAILED DESCRIPTION OF THE INVENTION

Although the present invention device and method can be used to turn many different types of rounded knobs, of the type used on many different types of equipment, the present invention device and method are particularly well suited for turning the rounded window knobs currently used on the windows of recreational vehicles and other forms of mobile homes. Accordingly, the illustrated examples of the present invention device will show applications where the device is being used to turn the rounded knob in the window assembly of a recreational vehicle.

In many types of modern recreational vehicles, the various window assemblies are opened and closed used a rounded knob. In order to open or close one of the window assemblies, the rounded knob must be rotated several times either clockwise or counterclockwise. The force needed to manually engage and turn the rounded knobs is substantial. Thus, it is difficult for many owners of recreational vehicles to open or close a single window, not to mention a whole series of windows. This difficulty becomes easier to understand when it is known that many owners of recreational vehicles are retired, elderly people.

Referring to FIG. 1, there is shown a typical rounded knob 10 of the type that is used in many recreational vehicles. The rounded knob is disk shaped and is symmetrically disposed around a shaft 12. Depressions 14 are periodically formed along the periphery of the rounded knob 10 to help a person obtain a firm grip on the rounded knob 10 when manually turning the rounded knob 10. To turn the rounded knob 10, a person grasps the rounded knob 10 and rotates the rounded knob 10 as far as his/her wrist strength will allow. The rounded knob 10 is then released and again grasped at a more suitable position. This process is repeated until the rounded knob is rotated enough times to cause the desired effect in the mechanism the rounded knob 10 controls. In the window assembly of a recreational vehicle, it is not uncommon that the rounded knob must be turned through ten full rotations to completely open or close the window assembly. However, the repeated grasping and turning of the rounded knob 10 is highly time consuming and strenuous to those who have limited strength and dexterity.

Figure 1:
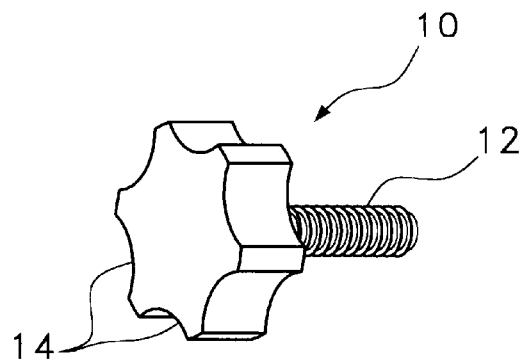
Figure 2:
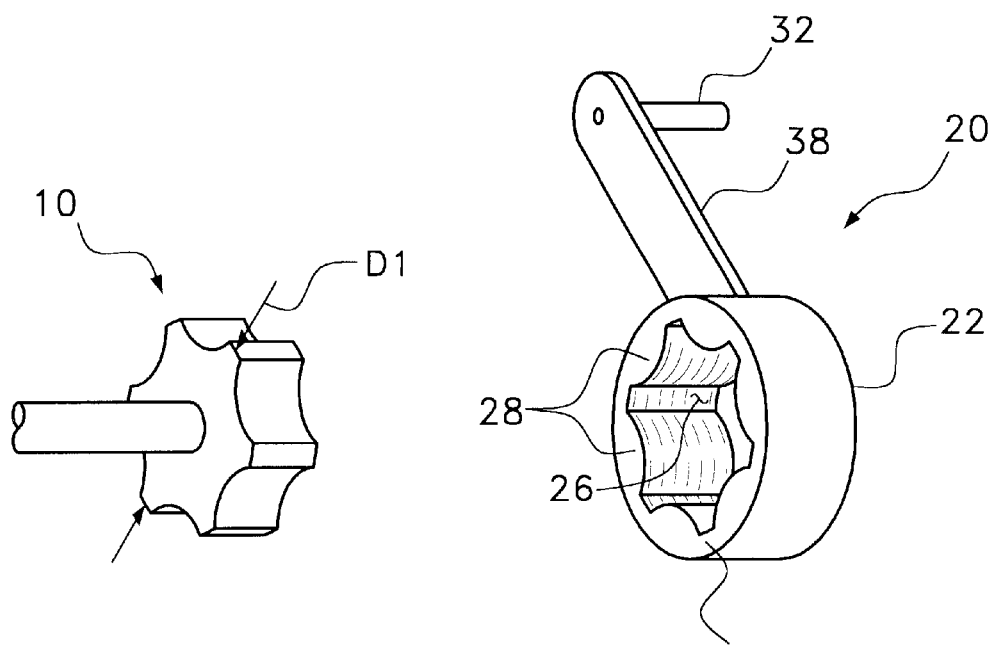

Referring now to FIG. 2, an exemplary embodiment of an auxiliary handle device 20 is shown in accordance with the present invention. The auxiliary handle device 20 has a hub 22 that is shaped to pass over a rounded knob 10 of the type previously described with reference to FIG. 1. The hub 22 has a peripheral wall 24 that extends from a back plate 26. The peripheral wall 24 defines a plurality of depressed areas 28 that extend inwardly toward the center of the hub 22. The depressed areas 28 cause the peripheral wall 24 to have a minimum diameter between the depressed areas 28 and a maximum diameter in all other areas. This alternating pattern produces a sinusoidal pattern that mimics the depressions 14 on the rounded knob 10.

As the hub 22 is advanced over the exterior of the rounded knob 10, the depressed areas 28 on the peripheral wall 24 pass around the depressions 14 in the rounded knob 10. The minimum diameter between the depressed areas 28 of the hub 22 is smaller than the maximum diameter D1 of the rounded knob 10. As a consequence, when the hub 22 is advanced over the exterior of the rounded knob 10, the hub 22 cannot freely rotate around the rounded knob 10. Rather, as the auxiliary handle device 20 is rotated, the hub 22 creates an interference fit with the exterior of the rounded knob 10. This causes the rounded knob 10 to rotate with the hub 22.

A handle 30 is coupled to the exterior of the hub 22. At the end of the handle 30, opposite the hub 22, the handle 30 terminates with a crank extension 32. The handle 30 and the crank extension 32 create a crank handle for the hub 22. Once the hub 22 is advanced over the rounded knob 10, the crank extension 32 can be grasped with the fingers and turned. The turning motion applied via the crank extension 32 is transferred to the hub 22 by the handle 30. The hub 22, in turn, transferred the rotational motion to the rounded knob 10. The auxiliary handle device 20 therefore provides a user with both leverage to apply increased torque to the rounded knob 10 and a crank to rapidly turn the rounded knob 10. A person of limited strength and dexterity can therefore rapidly and easily turn a rounded knob 10 that would otherwise be impossible to turn.

Once a particular rounded knob is turned using the auxiliary handle device 20, the device 20 is simply pulled off the rounded knob 10. Once the hub 22 is free of the exterior of the rounded knob 10, the auxiliary handle device 20 can then be used to engage an turn another rounded knob. Thus, with a single auxiliary handle device 20, a person can quickly and easily open or close all of the windows in their recreational vehicle.

In recreational vehicles, the rounded knobs used on the windows are typically of a standard size. Thus a single auxiliary handle device can be used to open and close all of the windows in the recreational vehicle. If rounded knobs exist in the recreational vehicle that are of different sizes, more than one auxiliary handle device can be provided. Each of the auxiliary handle devices provided would be used on the rounded handle of the appropriate size, in the same manner that different wrenches are used on different sized nuts.

Figure 3:
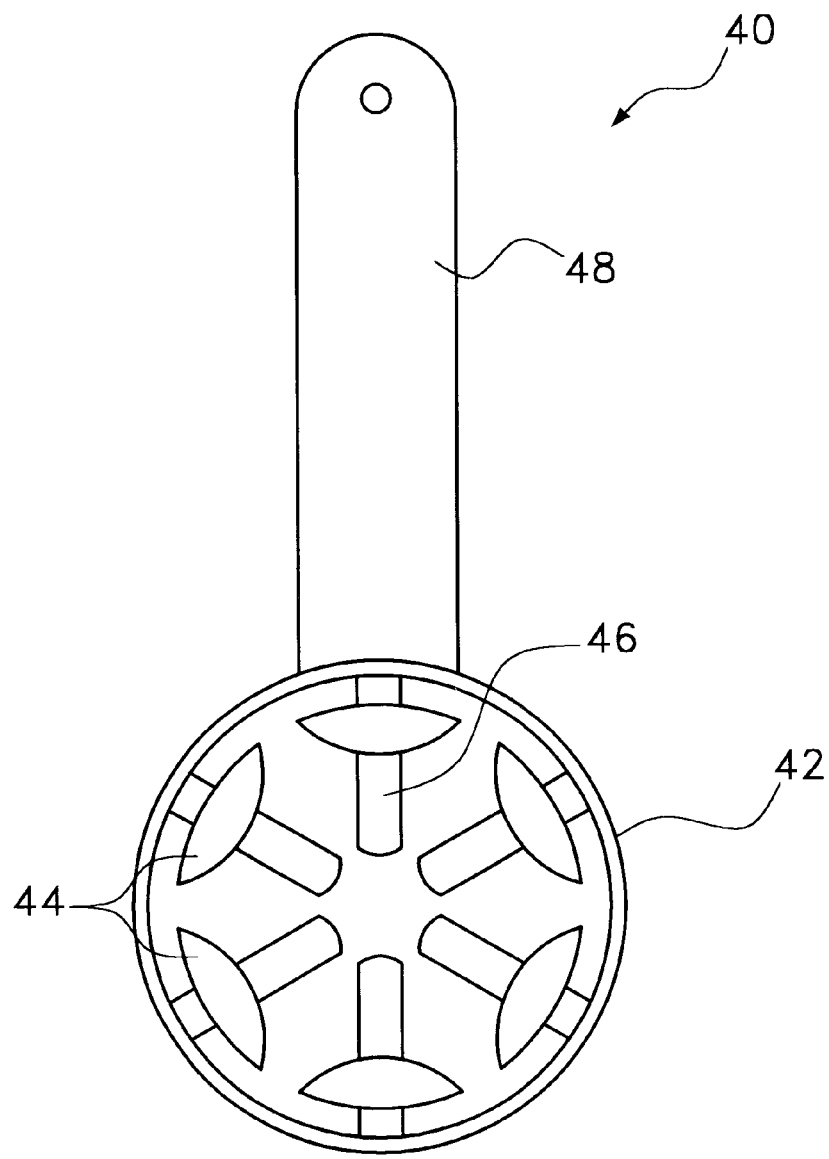

Referring to FIG. 3, an alternate embodiment of the present invention device 40 is shown. In this embodiment, there is a mechanism in the hub 42 that enables the hub 42 to engage rounded knobs of different diameters. In this embodiment, a plurality of contact elements 44 are symmetrically supported within the hub 42. Each of the contact elements 44 are capable of radially moving toward and away from the center of the hub 42 in a slot 46. To use the auxiliary handle device 40, the contact elements 44 are moved to their widest separation. The hub 42 is then placed over a rounded knob. If the rounded knob has depressions, the contact elements 44 are oriented over the depressions. If the rounded knob is completely circular, the orientation of the contact elements 44 is irrelevant, provided the exterior of the rounded knob passed in between the contact elements 44.

As with the earlier embodiment, a handle 48 and crank extension (not shown) extend from the hub 42. However, the handle 48 is not directly anchored to the hub 42, as will later be explained. As the handle 48 is rotated, the contact elements 44 move inwardly within the respective slots 46. As the contact elements 44 move inwardly, they eventually contact the rounded knob placed in the hub 22, regardless of the diameter of the rounded knob. If the rounded knob contains depressions on its exterior, the contact elements 44 engage those depressions, thus interconnecting the hub 42 to the rounded knob. If the rounded knob is completely circular, the contact elements 44 abut against the exterior of the rounded knob and interconnect the rounded knob with the hub 42 through a friction fit.

Figure 4:
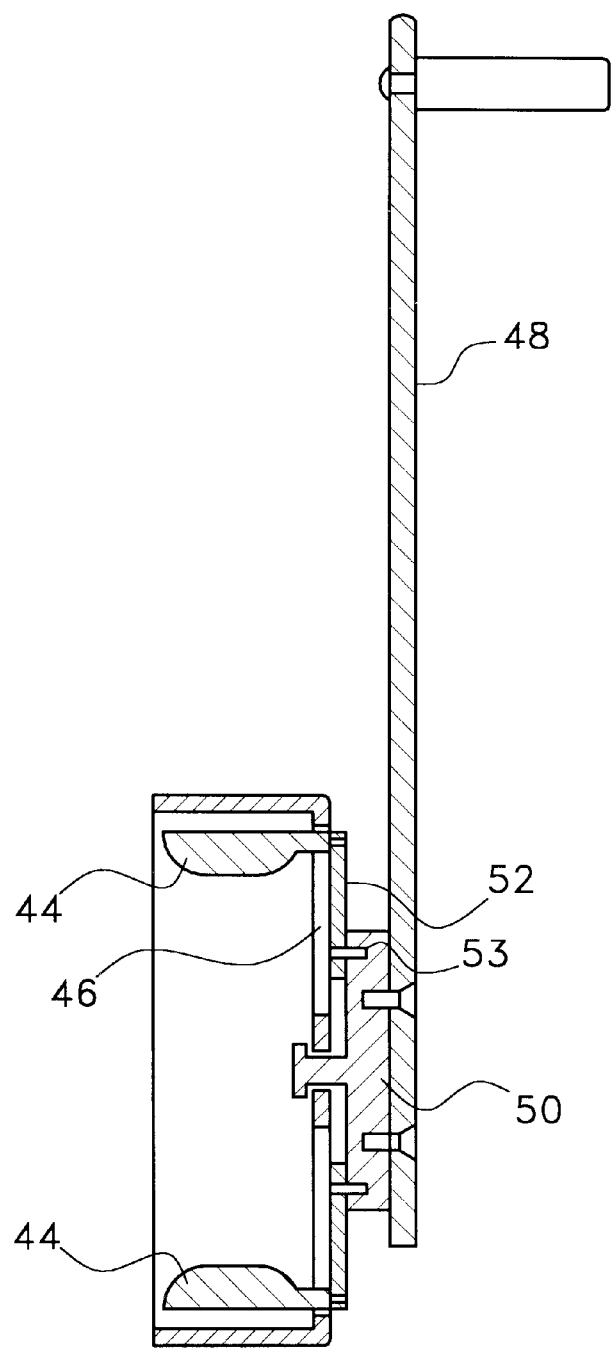

Referring to FIG. 4. it can be seen that behind the hub 42 within the auxiliary handle device 40, is a wheel 50. The wheel 50 is directly affixed to the handle 48. Consequently, when the handle 48 turns, the wheel 50 turns with the handle 48. Linkage arms 52 radially extend from the wheel 50. Each linkage arm 52 is coupled to the wheel 50 at a pivot 53. Thus, the linkage arms 52 can move relative the wheel 50. Each of the linkage arms 52 extends through one of the slots 46 on the back plate of the hub 42. Each of the contact elements 44 is attached to a corresponding linkage arm 52.

As the handle 48 is turned, the wheel 50 turns. As the wheel 50 turns, the linkage arms 52 are pulled toward the wheel 50. The movement of the linkage arms 52 cause the contact elements 44 to move on their slots 46 toward the center of the hub 42. As such, if the contact elements 44 are positioned at their maximum diameter, a turn of the handle 48 in either direction will cause the contact elements 44 to move toward the center of the hub 42. The more the handle 48 is turned, the closer to the center of the hub 42 the contact elements 44 move.

Once the contact elements 44 contact the exterior of a rounded knob, the contact elements 44 are prevented from moving any farther toward the center of the hub 42. Any further rotation of the handle 48 beyond the point of contact is translated into torque, wherein the torque is transferred to the rounded knob. As such, once the hub 42 is placed over a rounded knob and the handle is rotated, the contact elements 44 engage and turn the rounded knob regardless of its exterior diameter or configuration.

It will be understood that the embodiments of the present invention device and method described are merely exemplary and a person skilled in the art can make many variations to the embodiments shown without departing from the scope of the present invention. For example, the shape of the hub, handle and crank extension can be varied to create embodiments with vastly different physical appearances to the embodiments shown. Furthermore, the crank extension can be pivotly attached to the handle to promote easier turning. All such variations, modifications and alternate embodiments are intended to be included within the scope of the present invention as defined by the appended claims.

What is claimed is:

1. A device for engaging and turning a rounded knob of the type having depressions formed around its periphery, said device comprising:

a hub having a peripheral wall, said hub being sized to receive the rounded knob within said peripheral wall, wherein said peripheral wall has an interior surface that engages the depressions on the rounded knob when the hub is rotated;

a handle radially extending from said hub a predetermined length beyond said peripheral wall; and a crank extension protruding from said handle, wherein said handle and said crank extension are used for manually rotating said hub.

2. The device according to claim 1, further including a crank extension protruding from said handle.

3. The device according to claim 1, wherein said hub contains opposing sets of inwardly protruding areas on said interior surface of said peripheral wall.

4. The device according to claim 3, wherein said opposing sets of inwardly protruding areas are symmetrically disposed around said interior surface of said peripheral wall.

5. A device for engaging and turning a rounded knob, said device comprising:

a hub sized to receive the rounded knob therein;

contact elements within said hub that engage the rounded knob when said hub is rotated;

a handle radially extending from said hub; and a crank extension protruding from said handle, wherein said handle and said crank extension are used for manually rotating said hub.

6. The device according to claim 5, wherein said hub has a peripheral wall and said contact elements are depressions in said peripheral wall.

7. The device according to claim 6, wherein said peripheral wall defines six symmetrically disposed depressions.

8. The device according to claim 5, wherein said contact elements move toward each other as the handle is rotated.

9. The device according to claim 5, wherein said hub has back plate and a peripheral wall that extends from said back plate, wherein said back plate defines a plurality of slots.

10. The device according to claim 9, wherein said contact elements are coupled to a mechanism that moves said contact elements along said slots as said handle is rotated.

11. The device according to claim 10, wherein said mechanism includes a wheel that is coupled to said handle, wherein linkages are pivotably connected to said wheel, each of said linkages extending through a slot in said back plate and supporting a contact element in said hub.

12. The device according to claim 5, further including a crank extension protruding from said handle.

13. The device according to claim 1, wherein said contact elements are disposed within said peripheral wall, said contact elements being symmetrically disposed around a common point, wherein contact elements move toward said common point as the handle is rotated.

14. A method of turning a rounded knob having a peripheral edge, wherein a plurality of depressions are disposed along said peripheral edge, said method comprising the steps of:

providing an auxiliary handle device having a hub and a handle interconnected with said hub, wherein said hub has a contact elements that are symmetrically disposed around a central point on said knob;

advancing said hub over the rounded knob, wherein said contact elements are disposed around the peripheral edge of the rounded knob; and rotating said handle and causing said contact elements to move in unison toward said central point, thereby rotating said hub and causing an interference fit between said hub and the rounded knob.

15. The method according to claim 14, further including providing contact elements in said hub, wherein said contact elements move against the rounded knob as said handle is turned.

16. The method according to claim 14, wherein said hub defines a peripheral wall that passes over the rounded knob, said peripheral wall containing a plurality of inwardly protruding areas that correspond in position to the depressions on the rounded knob when said hub is rotated.

* * * * *